United States Patent
Maki

(10) Patent No.: US 9,554,588 B2
(45) Date of Patent: Jan. 31, 2017

(54) METHOD FOR MAKING MINERAL SALT AND MINERAL SALT PRODUCT

(71) Applicant: SMART SALT INC., Arnold, CA (US)

(72) Inventor: Juhani Maki, Kaivanto (FI)

(73) Assignee: SMART SALT INC., Arnold, CA (US)

( * ) Notice: Subject to any disclaimer, the term of this patent is extended or adjusted under 35 U.S.C. 154(b) by 0 days.

(21) Appl. No.: 14/649,620

(22) PCT Filed: Dec. 5, 2013

(86) PCT No.: PCT/FI2013/051145
§ 371 (c)(1),
(2) Date: Jun. 4, 2015

(87) PCT Pub. No.: WO2014/087056
PCT Pub. Date: Jun. 12, 2014

(65) Prior Publication Data
US 2015/0305377 A1   Oct. 29, 2015

(30) Foreign Application Priority Data
Dec. 7, 2012   (FI) ...................... 20126279

(51) Int. Cl.
*A23L 1/22* (2006.01)
*A23L 1/237* (2006.01)

(52) U.S. Cl.
CPC ............... *A23L 1/237* (2013.01); *A23L 27/00* (2016.08); *A23L 27/40* (2016.08); *A23L 33/16* (2016.08); *A23V 2002/00* (2013.01)

(58) Field of Classification Search
CPC ............ A23L 1/237; A23L 1/22; A23L 1/304; A23V 2250/161

USPC .......................... 426/649, 74, 519, 804, 806
See application file for complete search history.

(56) References Cited

U.S. PATENT DOCUMENTS

| | | | |
|---|---|---|---|
| 1,875,013 A | 8/1932 | Kaselitz | |
| 3,312,607 A | 4/1967 | Goodenough et al. | |
| 3,337,432 A | 8/1967 | Belski | |
| 3,798,314 A | 3/1974 | Suzukawa et al. | |
| 4,775,546 A * | 10/1988 | Higurashi | A23B 4/02 23/302 R |
| 6,787,169 B1 | 9/2004 | Maki | |

(Continued)

FOREIGN PATENT DOCUMENTS

| DE | 1567937 A1 | 10/1970 |
|---|---|---|
| DE | 3008171 A1 | 9/1981 |

(Continued)

OTHER PUBLICATIONS

International Search Report dated Apr. 7, 2014 issued in PCT/FI2013/051145.

(Continued)

*Primary Examiner* — Helen F Heggestad
(74) *Attorney, Agent, or Firm* — Wilson, Sonsini, Goodrich & Rosati

(57) ABSTRACT

A method for making a chloride based mineral food salt that contains sodium, potassium and magnesium comprises combining a carnallite-containing concentrated solution and a potassium chloride in an amount that corresponds to the desired potassium content in the final product. Sodium chloride is added a calculated amount to the formed salt mass for absorbing water, and the product is dried.

8 Claims, 1 Drawing Sheet

(56) References Cited

U.S. PATENT DOCUMENTS

Figure 1:
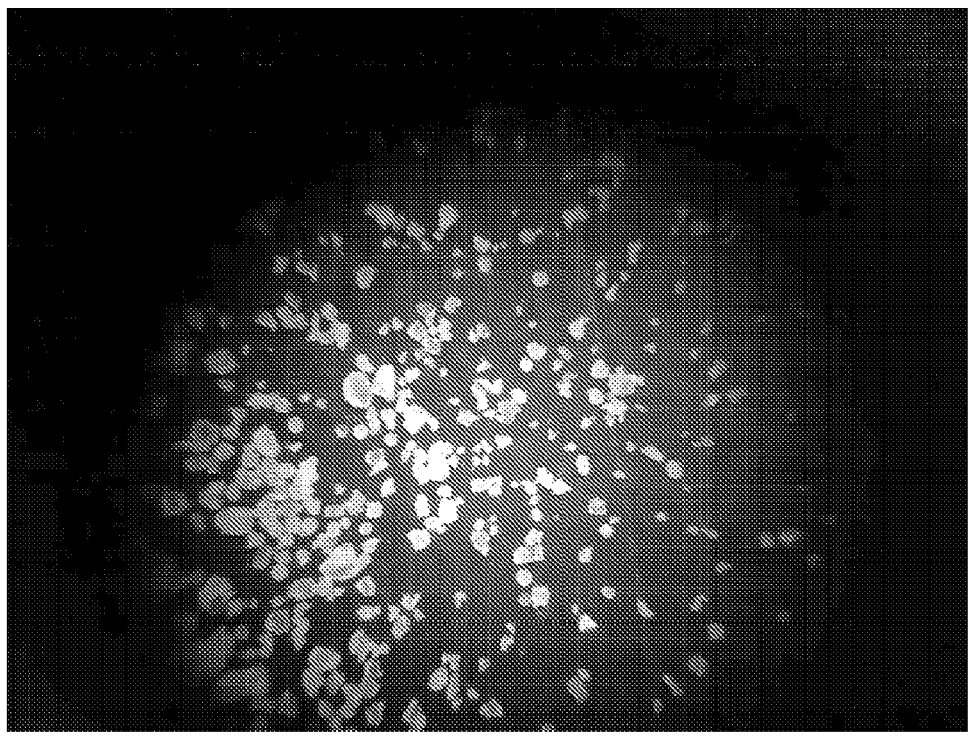

2012/0308487 A1* 12/2012 Stachiw ................. A23B 4/023
　　　　　　　　　　　　　　　　　　　　424/49
2013/0164424 A1* 6/2013 Einarsson ............... A23L 1/237
　　　　　　　　　　　　　　　　　　　　426/492

FOREIGN PATENT DOCUMENTS

| DE | 10304315 A1 | 8/2004 |
| EP | 1150578 B1 | 3/2005 |
| GB | 351845 A | 7/1931 |
| GB | 1308084 A | 2/1973 |
| JP | H01181762 | 7/1989 |
| WO | WO 90/00522 A1 | 1/1990 |
| WO | WO-9216117 | 10/1992 |
| WO | WO-9318668 A1 | 9/1993 |
| WO | WO 9318668 A1 | 9/1993 |
| WO | WO 95/07630 A1 | 3/1995 |
| WO | WO 00/44245 A1 | 8/2000 |
| WO | WO 2009/117702 A2 | 9/2009 |
| WO | WO 2012/166854 A1 | 12/2012 |
| WO | WO-2014087056 A1 | 6/2014 |

OTHER PUBLICATIONS

International Preliminary Report on Patentability dated Mar. 30, 2015 issued in PCT/FI2013/051145.

\* cited by examiner

METHOD FOR MAKING MINERAL SALT AND MINERAL SALT PRODUCT

This application is the National Phase entry of International Application No. PCT/FI2013/051145, filed on Dec. 5, 2013, which claims priority to Finnish Application No. 20126279, filed on Dec. 7, 2012, both of which are incorporated herein by reference in their entireties.

The invention relates to a method for making a physiologically beneficial nutrient salt that contains sodium, potassium and magnesium. In its basic form, the product contains metal chlorides only. The method is characterized by a low energy requirement and a fast manufacturing process.

Preparation of the above described salt products that contain potassium magnesium chloride hydrate, i.e. carnallite, or ammonium substituted carnallites, has been described in patent publications U.S. Pat. No. 6,787,169 B1 and EP 1 150 578 B1, and in application WO 2009117702 (A2) derived from these. In the above mentioned documents, carnallite, in this case potassium carnallite, is made by adding equivalent amounts of magnesium chloride hexahydrate and potassium chloride to water, whose amount is typically 120 to 140 ml per mole. The mixture is heated to boiling point (about 120° C.) and cooled down when all the material is in dissolved form: The formed crystals are isolated, dried, ground, and used in addition to sodium chloride and potassium chloride as a component of a food salt mixture in desired ratios. The documents also present buffering methods for compensating changes taking place in magnesium chloride solutions at said temperatures.

When contemplating possibilities of preparing the above described salt mixtures in a simpler way, one has to recognize that the solubility of potassium chloride in water is relatively low. Thus, for dissolving one gram of potassium chloride, 2.8 ml of water (20° C.) and 1.8 ml of boiling water is required. Furthermore, it has to be taken into account that carnallite is formed as a real double salt at high ionic strengths only, and that it is characteristic of potassium chloride to crystallize out of the solution in the presence of other salts, such as magnesium chloride.

In our studies, it was surprisingly found that the desired salt mixture can be advantageously prepared by adding an equivalent or close to an equivalent amount of magnesium chloride to a warm, almost saturated solution of potassium chloride. After the solution has been formed, a desired quantity of potassium chloride is still added to this solution under agitation, and finally the sodium chloride. The addition of the salts will quickly increase the ionic strength and simultaneously cool the mixture, and the carnallite (KCl.MgCl$_2$.6H$_2$O) will precipitate. The formed dryish crystal mass is allowed to stand overnight, after which it is dried e.g. in a vacuum. Allowing the mixture to stand, or possible turning over of the mixture, is advantageous because the size of the carnallite crystals will increase. An alternative is naturally to precipitate carnallite partly from the solution and then perform the above described salt additions for precipitating the carnallite.

The carnallite solution can be prepared advantageously in the temperature range from 20 to 100° C. Taking into account the above mentioned values relating to the solubility of potassium chloride, the salt product can be provided with a lo magnesium content higher than normal by preparing the carnallite solution at the temperature of, for example, 100° C. The amount of water applied in preparing the concentrated carnallite solution can be 10 to 20 ml, advantageously 10 ml per 100 g of the final salt product. The relatively low moisture content in the salt product will facilitate and thereby reduce the duration of the drying process. The finished dried product contains crystal water which is typical for carnallite.

In the method, after first preparing a sufficiently concentrated aqueous solution of potassium chloride, all the other salts can be added in solid state.

Taking into account the needs of food industry, the salt product can also be brought to a completely soluble form before it is dried to sprinklable form.

It is noteworthy that the method does not involve any filtering. Consequently, no salt solutions are formed which should be subjected to further processing or recirculated in the process. The low temperature is also advantageous in view of the handling of magnesium chloride, because it starts to decompose partly above the temperature of 105° C., producing small amounts of hydrogen chloride. Prepared by this method, the product does not contain free magnesium chloride, which would result in problems of water absorption. The dried product is pleasant in taste, easily flowable, and meets the requirements set for low hygroscopicity.

The invention is also characterized in that for preparing the product, it is possible to use fine-grained sea salt or table salt products derived from sea salt instead of purified sodium chloride. In the case of pure sodium chloride, the product obtained only consists of an equivalent amount of chlorides in addition to sodium, potassium and magnesium ions. The use of sea salt or a product derived from sea salt as the sodium source may also introduce low contents of other substances, such as micronutrients, into the product.

It is naturally possible to include additives that primarily improve the taste, for example ammonium chloride, carbohydrates, spices, refined plants or their fruit, nut powder, acidity regulators, glutamates, amino acids, their oligomers, or the like, in the finished product.

Advantageously, iodine is also added to the salt by the same methods and in the same contents as table salt is iodized.

The product can be made to a solid salt product which has suitable grain size or grain size distribution and can be sprinkled. This salt product can be packed in sales packages which can be consumer packages to be used in households, or large-scale consumer packages for professional use (food industry, restaurants, institutional kitchens).

Figure 2:
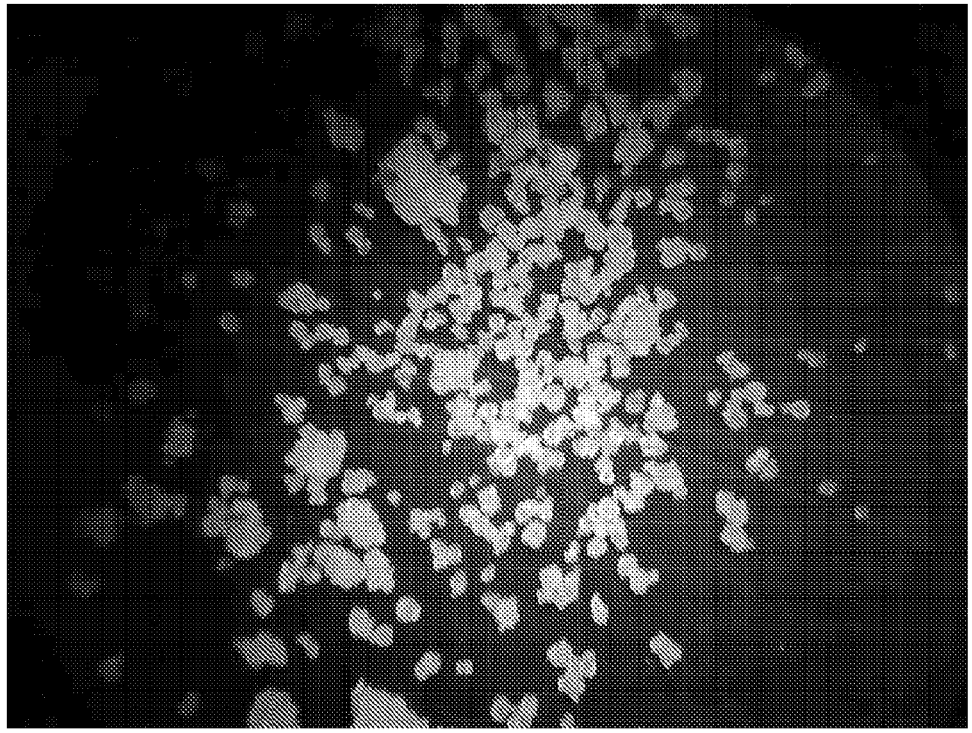

In the following, the invention will be described in more detail with reference to examples and the appended drawings, in which FIG. 1 is a photograph of a salt product according to the prior art, taken through a light microscope (10× enlargement), and FIG. 2 is a photograph of a salt product made by the method according to the invention, taken through the same light microscope.

The heterogeneous product shown in FIG. 1, which is a mechanical mixture, contains a large quantity of very small crystals which probably consist of carnallite, i.e. ammonium potassium carnallite made by a method of prior art (ratio 25% of NH$_4$/75% of K). The crystal size of the smallest fraction is in the range from 0.05 to 0.15 mm. In general, the size distribution of the crystals is very broad.

FIG. 2 shows a product made by the method according to the invention (example 1 to be described below). The product consists primarily of large crystals. The smallest crystal size seems to be larger than 0.15 mm, and this crystal size does not represent a large proportion of the product. A certain equigranular property can be seen in the product, in which the most common crystal size is represented by more than ⅔ of all the crystals in number. Some of the crystals of this most common crystal size (about 0.5 to 1.5 mm) have "stuck together" to form agglomerates during drying, wherein continuous ion exchange has taken place between the crystals, as a result of dissolving and recrystallization. These agglomerates can be easily disintegrated to single crystals of the most common crystal size. By number, clearly more than 95% of all the crystals are larger than 0.15 mm; even a greater amount of them by weight (wt-%). The crystal size refers to the maximum diameter of the crystal. As shown in FIG. 2, the shape of the crystal is between cubical and spherical.

The dissolution of the salt fractions, for example in the mouth of a tasting person, is likely to take place primarily in relation to their mutual specific areas. Thus, in tasting tests, heterogeneous mixtures have been found to evoke, as the first taste, the specific taste of the carnallite type in question, whereas a product made by the method according to the invention, in which the fine-grained fraction is missing, will give a taste almost resembling that of sodium chloride. It can also be assumed that in the product made by the method, even the smallest crystals are a mixture of carnallite and sodium chloride.

It is not a mixture of crystals of different salts but a product in which sodium chloride (NaCl) and carnallite ($KCl.MgCl_2.6H_2O$) have been crystallized together in the same crystals when dissolution and recrystallization of salts repeatedly takes place in the moist crystal mass being formed.

As shown in FIG. 2, the new product has a considerably narrower crystal and particle distribution as the heterogeneous mixture shown in FIG. 1. Thus, stratification cannot take place to the same extent as in heterogeneous mixtures. Stratification may also distort taste tests. Although solid salt is rarely tasted as such, this taste has an important effect in evoking the first impression. Similarly, salt is often sprinkled on food in such a way that it remains in the form of crystals and is not dissolved.

Consequently, the finished solid salt product has been found to have a homogeneous physical structure; in other words, it is equigranular in its crystal structure. It is not a mixture of crystals of different salts but a product in which sodium chloride (NaCl) and carnallite ($KCl.MgCl_2.6H_2O$) have been crystallized together in the same crystals when dissolution and recrystallization of salts repeatedly takes place in the moist crystal mass being formed.

The salt product is used by adding it to food for improving the taste and/or preservability. In this context, the food should be understood in a wide sense. The addition can be made to finished food or to its raw material during the preparation.

The invention will be described in more detail in the following examples.

EXAMPLE 1

3.73 g (0.05 mol) of potassium chloride was dissolved in 10 ml of water at a temperature of about 40° C. 10.1 g (about 0.05 mol) of magnesium chloride hexahydrate was added to the mixture. The vessel was heated for compensating the heat of dissolution, and agitated. 16.3 g of potassium chloride and, after about 5 min, 70 g of sodium chloride were added to the solution which was slightly turbid. A moist well mixable salt mass was formed, which was allowed to stand for about 16 h in a closed vessel at intermittent stirring. The product was dried at about 30° C. The product was even-grained and fluffy.

The product contains: 27.5 wt % Na
10.5 wt % K
1.2 wt % Mg

EXAMPLE 2

The procedure according to Example 1 was repeated by adding 21.3 g of solid potassium chloride and 65 g of sodium chloride to the cooled carnallite solution. The crystal mass was then processed as described above.

The metal ion composition of the product is: 25.6 wt % Na
13.1 wt % K
1.2 wt % Mg

EXAMPLE 3

The example describes a process in which a carnallite solution is prepared at a higher temperature than in the above examples and in which fine-grained sea salt is used instead of pure sodium chloride for introducing the sodium chloride fraction.

5.22 g (0.07 mol) of potassium chloride was added to 10 ml of water. The mixture was heated close to the boiling point, and 14.2 g of magnesium chloride hexahydrate was added to the slightly turbid solution formed. The mixture was heated under continued agitation until a solution was formed.

The mixture was allowed to cool to about 50° C., and 15.6 g of solid potassium chloride and, after about 5 min, 65 of fine-grained sea salt were added under agitation. The mixture was homogenized and allowed to stand for about 16 h in a closed vessel at intermittent stirring. The dryish crystal mass was finally dried at about 30° C. The product was even-grained and fluffy.

The metal ion composition of the product is: 25.6 wt % Na
10.9 wt % K
1.6 wt % Mg In the examples, the rest of the salt consists of chloride ions. As mentioned above, due to the salt raw materials used, the product may also contain traces of other cations and anions, but these do not affect the physical structure of the product, which is determined by the crystal system formed by carnallite and sodium chloride.

The invention claimed is:

1. A method for preparing a chloride-based mineral food salt that contains sodium, potassium and magnesium, comprising (a) first combining a carnallite-containing concentrated solution and potassium chloride in an amount that corresponds to the desired potassium content in the final product, (b) second adding an amount of solid state sodium chloride to the formed salt mass for absorbing water, and (c) third drying the product to form a salt in which carnallite and sodium chloride are crystallized together in a crystal having a homogenous physical structure.

2. The method according to claim 1, wherein the carnallite solution, to which a salt or salts are added, is supersaturated or undersaturated.

3. The method according to claim 1, wherein the carnallite solution contains an amount of potassium chloride that exceeds the equivalence, and the excess potassium chloride is totally or partly in solid state in the solution.

4. The method according to claim 1, further comprising adding one or more adjuvants which are useful primarily in view of the taste to the salt product.

5. The method according to claim 4, wherein said one or more adjuvants are selected from the group consisting of ammonium chloride, spices, fine ground plants and/or nuts, carbohydrates, proteins, amino acids, and glutamic acid.

6. The method according to claim 1, further comprising adding, a physiologically acceptable amount of calcium, zinc, phosphates, or trace elements to the salt product.

7. The method according to claim 1, further comprising adding a physiologically acceptable amount of iodine to the salt product.

8. The method according to claim 1, wherein sea salt is used for introducing the sodium chloride fraction.

* * * * *